United States Patent [19]

McGeehee

[11] Patent Number: 4,635,513
[45] Date of Patent: Jan. 13, 1987

[54] SAW GUIDE OIL SYSTEM

[76] Inventor: Ronald W. McGeehee, 9049 East Rd., Redwood Valley, Calif. 95470

[21] Appl. No.: 689,198

[22] Filed: Jan. 7, 1985

[51] Int. Cl.⁴ .............................................. B27B 11/02
[52] U.S. Cl. ........................................ 83/169; 83/171; 83/821
[58] Field of Search .................... 83/169, 13, 171, 820, 83/821, 425.2, 425.3, 508.3

[56] References Cited

U.S. PATENT DOCUMENTS

| 3,097,675 | 7/1963 | Benedict | 83/169 |
| 3,104,576 | 9/1963 | Robinson | 83/169 |
| 3,557,848 | 1/1971 | Wright | 83/820 |
| 3,623,520 | 11/1971 | Neild | 83/169 |
| 3,661,045 | 5/1972 | Mermelstein | 83/676 |
| 3,750,503 | 8/1973 | McMillan | 83/16 |
| 3,961,548 | 6/1976 | Clausen | 83/169 |
| 4,136,590 | 1/1979 | Kordyban et al. | 83/169 |

Primary Examiner—James M. Meister
Assistant Examiner—John L. Knoble
Attorney, Agent, or Firm—Townsend & Townsend

[57] ABSTRACT

A saw guide system having a mechanism for applying an oil film to individual saw blades is described. The use of a lubricating film greatly reduces the accumulation of heat in the sawing system and allows operation of the sawing system without the introduction of cooling water. Saw guide blocks having both common and separate distribution networks for oil and water may be utilized in the saw guide system.

9 Claims, 6 Drawing Figures

U.S. Patent   Jan. 13, 1987   Sheet 1 of 5   4,635,513
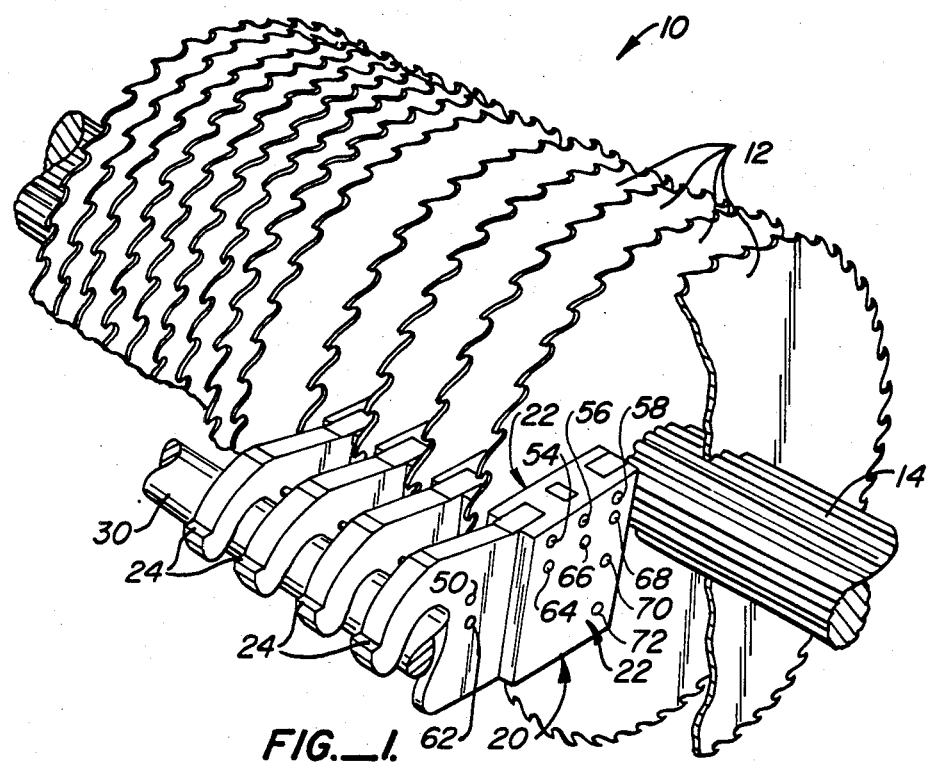
FIG._1.
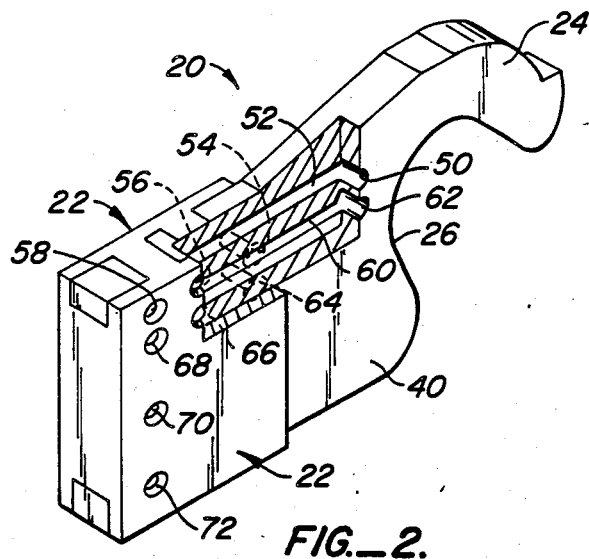
FIG._2.

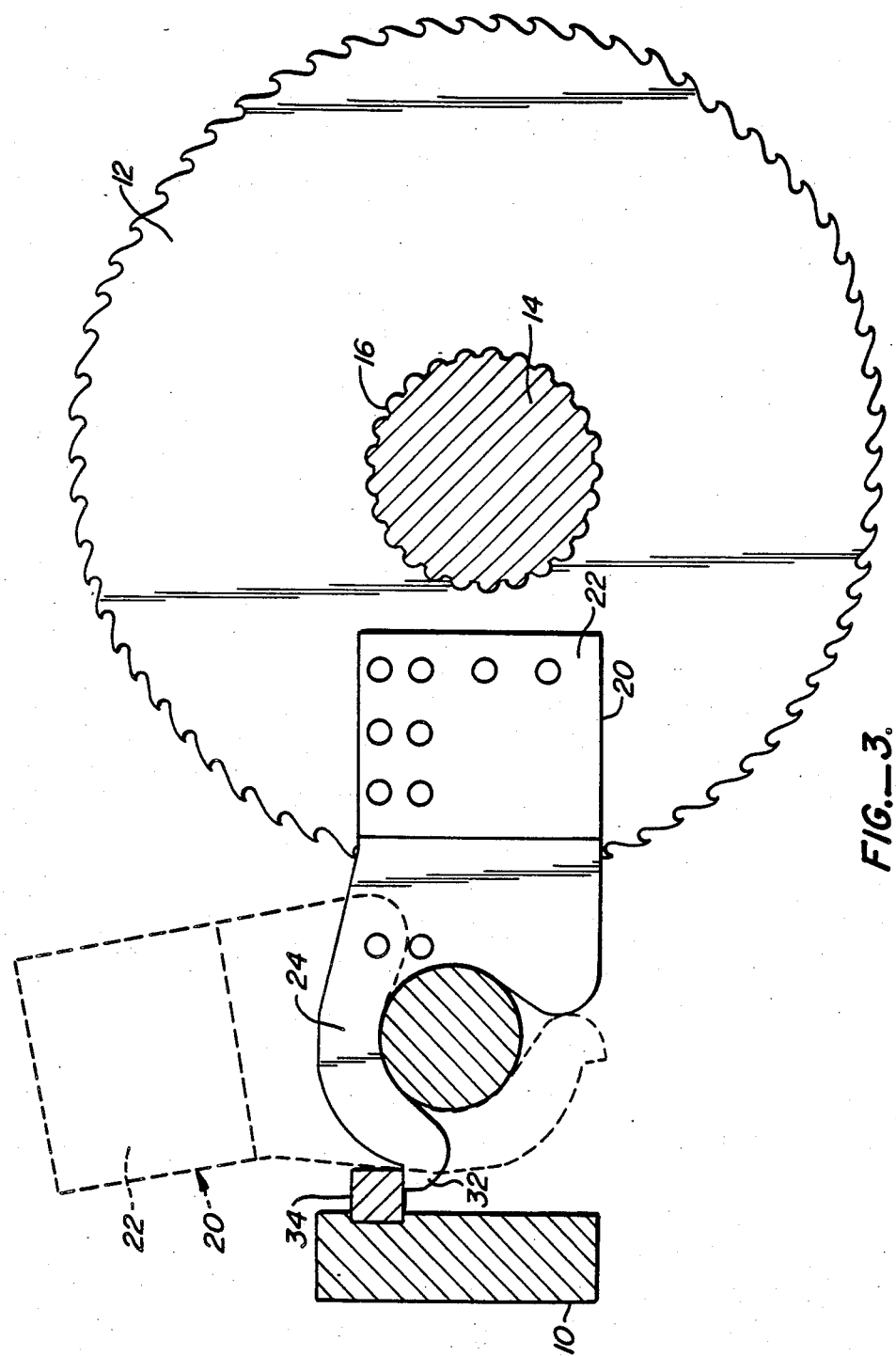
FIG._3

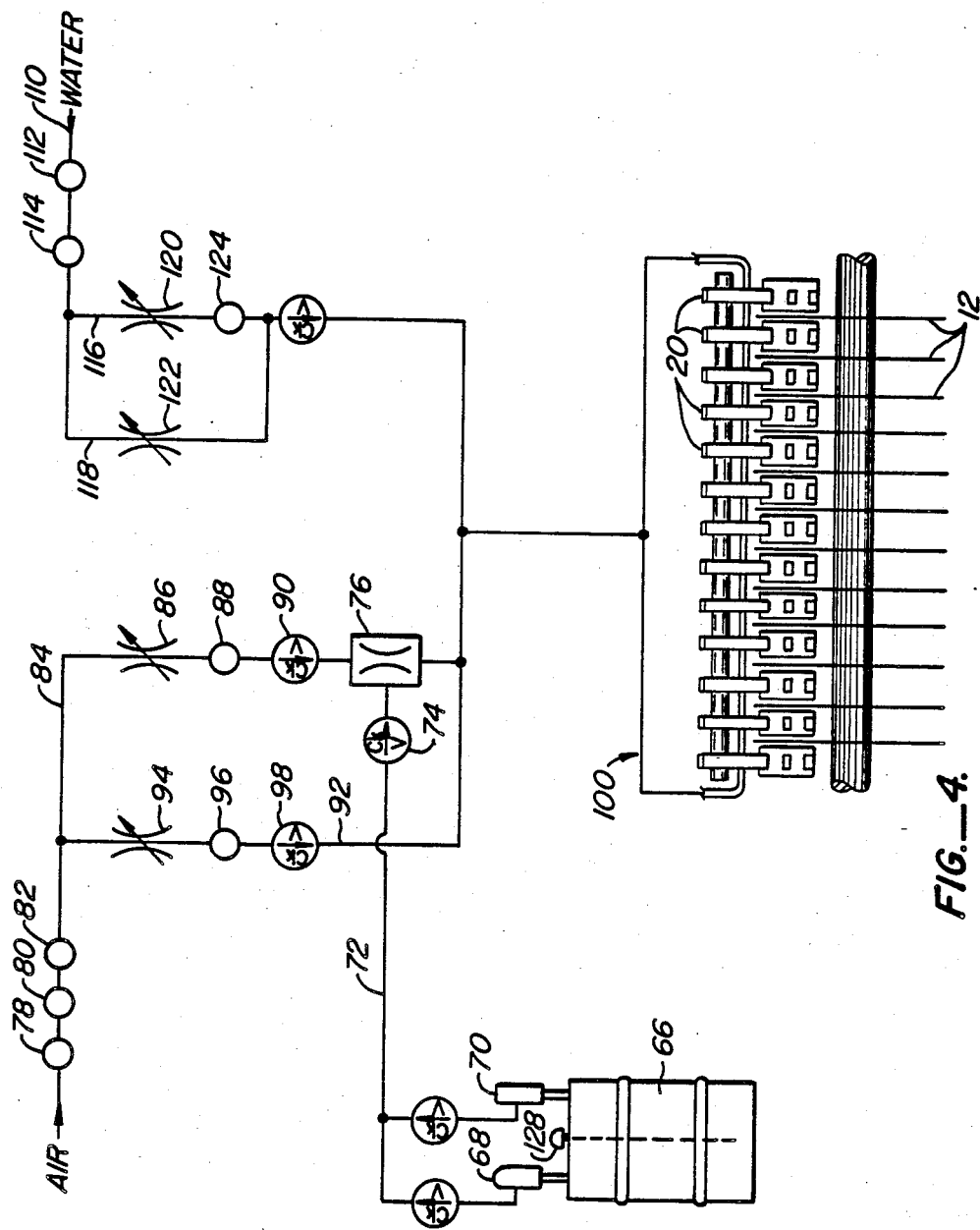
FIG._4.

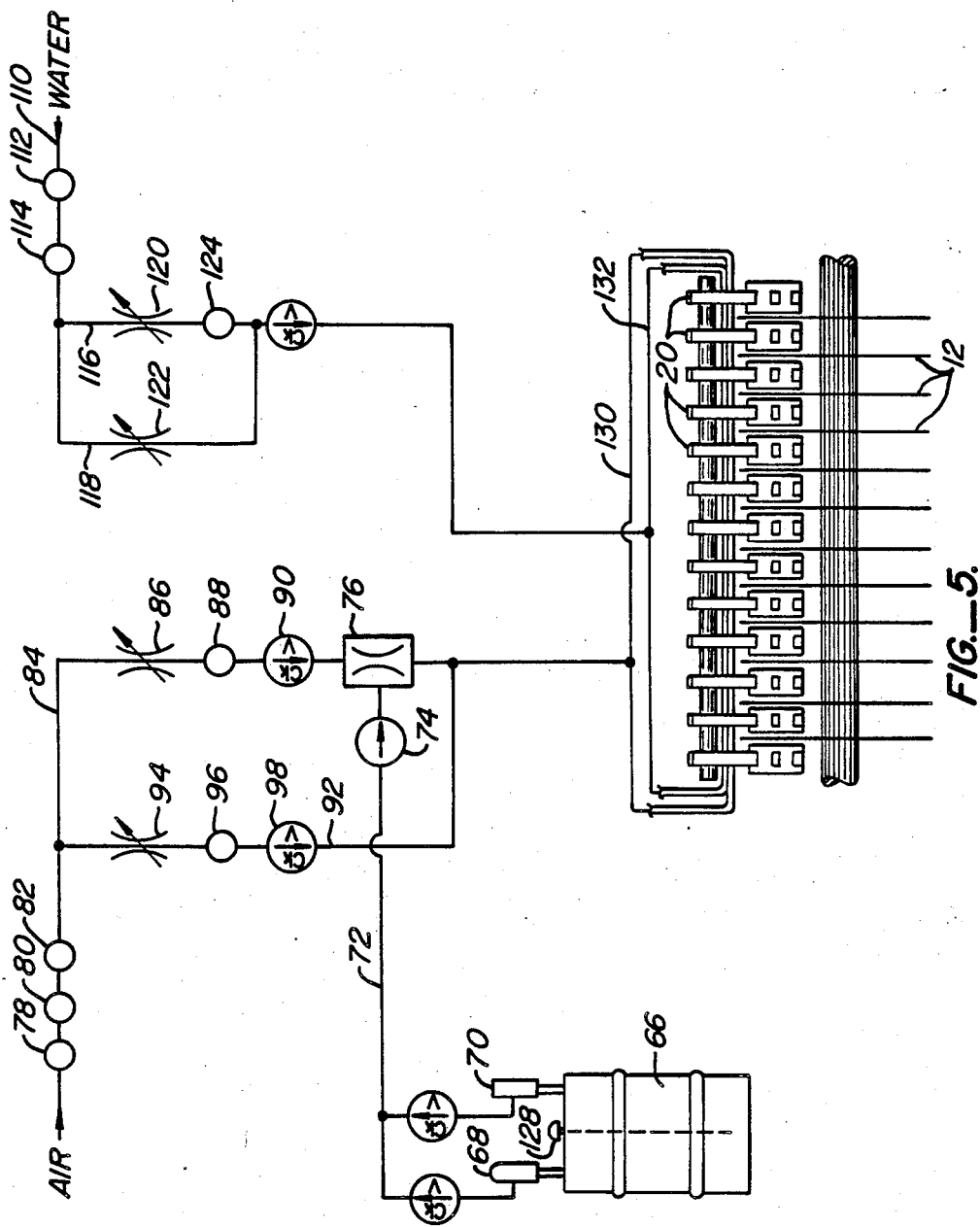

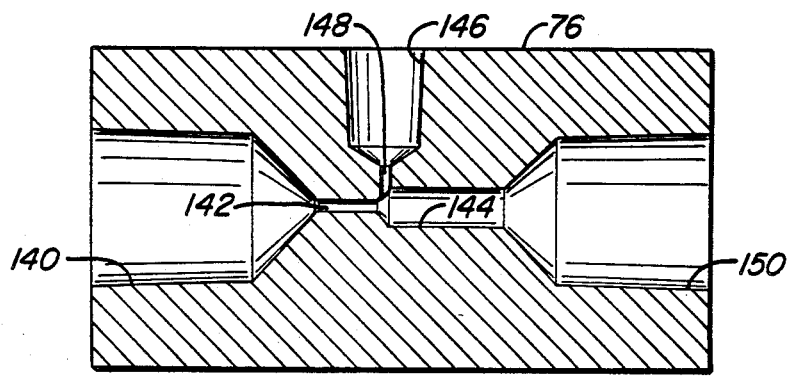
FIG._6.

SAW GUIDE OIL SYSTEM

BACKGROUND OF THE INVENTION

The use of multiple blade saw systems is widespread in the lumber industry. Certain types of multiple blade saw systems such as gang and shifting saw edgers, use very thin circular saw blades, typically in the range from about 0.030 up to about 0.375 inches, to reduce power consumption and increase the total amount of wood remaining after cutting. Such thin saw blades, however, require "saw guide" systems to prevent warping and deformation of the blade during use. The guide systems typically consist of metallic blocks having low friction bearing surfaces placed between adjacent pairs of saw blades. In this way, each saw blade passes through a "guide" channel which is defined by the two bearing surfaces on either side thereof.

In addition to the saw guide systems, such thin blade multiple saw assemblies have typically required cooling water systems to cool both the saw blades and saw guides while the saws are cutting. The cooling water may be sprayed directly onto the saws and guides from a remote spray bar, or the water can be applied directly to the saw blade through passages drilled in the saw guide itself. Typical water consumption for cooling will be between about 6 and 10 gallons per hour per blade. In a large multiple saw assembly having 15 saw blades, the total usage per year can be as much as 400,000 gallons or more.

It would be very desirable to provide an alternate approach for preventing excessive accumulation of heat in multiple saw assemblies of the type just described.

SUMMARY OF THE INVENTION

The present invention provides an improved system and method for supporting and cooling circular saws in multiple saw assemblies. The system employs a plurality of individual saw guide blocks, each of which include at least one bearing surface intended to be placed adjacent the flat face of a saw blade. By placing a second such guide block against the opposite face of the saw blade, the two guide blocks together define a guide channel which prevents deformation and warping of the saw blade as it is rotated.

The present invention relies on the discovery that a major portion of the heat generated during the sawing of wood arises from friction between the saw guide block bearing surfaces and the saw blade, rather than from the cutting action of the blade in the wood being sawed. Based on this discovery, it was found that by applying very small amounts of lubricating oil through the saw guides onto the saw blade, the need to apply water to the blades for cooling can be greatly reduced or eliminated altogether. The use of oil lubricating rather than water cooling greatly simplifies the cutting operation, reduces operating costs, and greatly decreases overall water consumption of the lumber processing plant.

BRIEF DESCRIPTION OF THE DRAWINGS

FIG. 1 is a perspective view of a multiple blade saw assembly employing the saw guide system of the present invention.

FIG. 2 is an isometric view of a saw guide block of the present invention with portions broken away to show the integral fluid passages for distributing oil and water.

FIG. 3 is a front elevational view of a saw guide block mounted on a guide rack and shown adjacent a saw blade.

FIG. 4 is a schematic diagram showing the oil and water connections to a common oil/water distribution network in the saw guide block of the present invention.

FIG. 5 is a schematic diagram showing the oil and water supply systems for a saw guide system having separate oil and water distribution networks.

FIG. 6 is a sectional view of a venturi suitable for atomizing oil in an air stream for application to saw blades in the present invention.

DESCRIPTION OF THE PREFERRED EMBODIMENT

Referring to FIG. 1, a multiple blade saw assembly 10 includes twelve individual saw blades 12 mounted on a common drive shaft 14. The outer surface of the drive shaft 14 includes axially aligned serrations which engage a similar pattern of serrations in the center hole 16 (FIG. 3) of the saw blade 10. In this way, slippage of the saw blade 10 on the drive shaft 14 is prevented.

The saw blades 12 are axially spaced apart on the drive shaft 14 to perform a number of parallel cuts on the lumber being sawed. Individual guide blocks 20 are interdigitated between adjacent saw blades 12, having bearing surfaces 22 lying immediately adjacent the face of each adjacent saw blade 12. Clearance between the bearing surface 22 of the guide block 20 and the saw blade 12 will typically be in the range from about 0.001 to 0.004 inches, and the bearing surface 22 will be made of a low friction material in order to reduce heat generation as the blades are rotated.

Each saw guide block 20 includes a mounting bracket 24 at the end opposite the bearing surface 22. The mounting bracket 24 defines a U-shaped clamp 26 (FIG. 2) which is received on a guide support rod 30. The mounting brackets 24 are fixedly attached to the support rod 30 so that rotation of the support rod 30 (in the counterclockwise direction as illustrated in FIG. 3) will cause the guide blocks 20 to raise from between the adjacent saw blades 12. Referring to FIG. 3, the guide blocks 20 are illustrated in their raised positions in broken line. The mounting bracket 24 includes a stop hook 32 which engages a block 34 fixedly mounted on the frame of the saw assembly 10. The guide block 20 in its raised position also rests against the block 34. Thus, the block 34 defines both the lowered and raised positions of the guide block 20.

Up until this point in the description, the construction of the saw guide system has been conventional. The present invention comprises an improvement to the system, specifically comprising means for delivering oil to the individual guide blocks 20 and for applying oil from the guide blocks onto the individual saw blades 12.

Referring now to FIG. 2, each guide block 20 comprises an inner structural member 40 which is typically steel and machined to the desired external dimensions and to include certain internal passageways, as will be described in detail below. Onto the inner structural member 40, the bearing surfaces 22 are typically formed by casting. As stated hereinbefore, suitable bearing materials are typically low friction metals, glasses, or other materials which may be easily molded onto the inner member 40 to the desired tolerances. The use of molded bearing surfaces allows easy replacement of the bearing surfaces when they become worn.

The internal member 40 of the saw guide 20 will include a number of passages for receiving and distributing both oil and water. In the preferred embodiment, there will be a separate, isolated network of fluid passages for the distribution of lubricating oil, as well as a second separate network of fluid passages for distributing cooling water. The first network includes a transverse hole 50 which penetrates the entire width of the inner member 40. Joining the transverse passage 50, an axial passage 52 is provided and connects to three additional transverse passages 54 (shown in phantom in FIG. 2), 56, and 58. The three passages 54, 56, and 58 are located in the bearing end of the guide block 20, and corresponding passages through the bearing surface 22 are provided. Typically, nozzles (not shown) will be provided at each end of the axial passages 54, 56, and 58 to control the volumetric flow of oil emitted onto the saw blade. To provide an even flow between the three outlets 54, 56 and 58, it is desirable to size the orifices progressively larger as they are more remote from the inlet 50 to compensate for the loss of pressure.

The preferred guide block 20 also includes a second axial passageway 60 having a transverse inlet port 62 at its inner end (proximate the mounting bracket 24) and a plurality of outlet nozzles 64-72. The outlet nozzles 64-68 are located along the axial passage 62 and penetrate the bearing surface 22. The remaining outlet passages 70 and 72 are joined to the axial passage by a vertical internal passage (not shown). Again, the outlet passages 64-72 will normally be provided with nozzle orifices to control the flow rate of the water therefrom.

It will be appreciated that while the preferred embodiment of the present invention employs separate lubricating oil and water distribution passages within the guide block 20, the present invention may also include a common distribution network for both the oil and the water. Each of these systems is described in more detail in connection with FIGS. 4 and 5.

Referring now to FIG. 4, the connection of lubricating oil and water to the saw guide system having a common oil and water distribution network within each saw guide block is illustrated. Oil is supplied in a drum 66 having both a high volume metering pump 68 and low volume metering pump 70. The outputs from both pumps 68 and 70 are manifolded into a common line 72 which feeds directly through a check valve 74 into a venturi 76. The venturi 76 acts to form an oil spray by means of air induction. An air supply passing through a filter 78, regulator 80, and lubricator 82 is provided to induce a spray through the venturi 76. Air is directed through line 84 and flow control valve 86 into the venturi 76. A solenoid 88 is provided to allow remote operation of the system, and a check valve 90 prevents backflow of oil into the air system. A bypass airstream 92 is also provided with a flow controller 94, solenoid valve 96 and check valve 98. The bypass airstream 92 mixes with the output of the venturi 76 to carry the oil mist into distribution manifold 100.

Referring now to FIG. 6, the construction of oil induction venturi 76 will be described. The venturi includes an air inlet 140 which connects to a narrow axial passage 142, having a diameter in the range from about 0.06 to 0.09 inches. Passage 142 flares into a second axial passage 144, having a diameter in the range from about 0.18 to 0.25 inches. Oil inlet 146 connects to the flared transition between axial passages 142 and 144, via a connecting passage 148. The air carrying the atomized oil passage out of outlet port 150.

Water input into the distribution manifold 100 is also provided. A water source 110 is run through filter 112 and solenoid 114. The water is branched into lines 116 and 118, each of which is provided with a flow control valve 120 and 122, respectively. Typically, the flow control valve 122 will be set to deliver a relatively low flow rate of water, in the range from about 0.05 to 0.5 gpm, while the other flow control valve 120 is set to deliver a higher flow rate of water, in the range from about 0.5 to 1 gpm. A second water solenoid valve 124 is provided in line 116. In this way, a low water flow rate is achieved by actuating the first solenoid valve 114, while a high water flow rate is achieved by actuating both solenoid valves 114 and 124.

The distribution manifold 100 is connected to the saw guides 20 in series. The saw guides 20 are substantially as illustrated in FIG. 2, except that only a single network of passages 50-58 is connected. The manifold 100 is connected through transverse ports 50 to supply oil/water to each of the saw guides 20.

In operation, the oil supply drum 66 is filled with a suitable lubricating oil, typically a low viscosity synthetic polymer lubricant. The precise nature of the oil lubricant is not critical, although the lubricant should be non-flammable and non-toxic. A low level switch 128 is provided to automatically switch on the water system when the oil level is low and to remind the user when to refill the tank 66. To start up the system, the air flow through solenoids 88 and 96 are initiated and both oil feed pumps 68 and 70 are started. As the saw blades 12 are rotated, the high volume start-up pump 68 delivers a sufficient amount of oil to provide a film on the blades which is about 0.001 to 0.003 inches thick, typically about 0.002 inches. Typically, this will require from about 1 to 20 cubic inches of lubricating oil, depending on the number and size of the saw blades 12. After the initial charge of lubricating oil has been introduced into the system, the high volume start-up pump 68 and the high volume air flow through solenoid 96 are shut off. The low volume oil flow through pump 70 and misting air through solenoid 88 are continued throughout normal operation of the system. The mist air to oil ratio should be adjusted to minimize oil consumption while allowing sufficient oil for lubrication. Typically, oil consumption is about 0.5 to 1.0 cubic inches per hour per saw blade, depending on the size of the saw blade.

The water system is provided only for emergencies or unusually operating conditions. If the saws become stuck in the wood, or if the wood contains high amounts of pitch, it will usually be necessary to apply cooling water. For emergency conditions, both the low water and high water solenoids (114, 124) are actuated to deliver sufficient water to cool the saw guide blocks. The low water flow through flow control valve 122 is provided to allow operation when oil is unavailable. The low water supply will be on at all times and the high water system will be turned on only when the saws are in use.

Turning now to FIG. 5, a dual oil/water manifold system will be described. The oil supply and water supply systems are identical to those just described for the single manifold system up until the point where oil manifold 130 and water manifold 132 are connected. The oil manifold 130 connects into the oil inlet port 50 of the outermost saw guide block 20. The inlet ports 50 of each successive guide block 20 can then be connected using short connecting conduits. In a similar manner, the water manifold 132 is connected to the water inlet port 62 of each of the guide blocks 20. The operation of the two manifold system is essentially the same as that described before the single manifold system. The advantage of the dual manifold system is that the oil manifold and distribution network in each individual saw guide block will not be flushed with water each time the water system is used. This provides a substantial advantage since it allows immediate resumption of operation using the oil system.

While control may be accomplished manually, it is preferable to employ an automatic timing and switch controller. Conveniently, commercially available programmable logic controller having real time operation capability may be utilized. Alternatively, conventional drum rollers actuating solenoid outputs may also be utilized.

Although the foregoing invention has been described in some detail by way of illustration and example for purposes of clarity of understanding, it will be obvious that certain changes and modifications may be practiced within the scope of the appended claims.

What is claimed is:

1. An improved saw guide system for supporting circular saws in a multiple saw assembly, said saw guide system including a guide block between each adjacent pair of blades and on the outside of each end blade, said improvement comprising means integral to each guide block for directing lubricating and cooling fluids onto the proximate saw saw blade in order to lessen friction between and reduce the heat generated by the blade and the guide, including an oil passage network and a water passage network where the two networks are isolated from each other; an external oil source connected to said oil passage network; an external water source connected to said water passage network; and means for selectively directing either oil or water to the fluid directing means.

2. A saw guide system including:
a plurality of saw guide blocks each comprising means at one end for mounting the block on a guide rack and at the other end a bearing surface for bearing against a surface of a circular saw blade, said saw guide blocks characterized by a first network of integral fluid passages for distributing oil and including an inlet in the mounting means and at least one outlet in the bearing surface and a second network of integral fluid passages for distributing water and including an inlet in the mounting means and at least one outlet in the bearing surface, said first and second networks being isolated from each other;
an oil supply system connected to the inlet of the first network of fluid passages;
a water supply system connected to the inlet of the second network of fluid passages and;
means for selectively delivering either the oil or the water to the respective network of fluid passages.

3. An improved saw guide system as in claim 2, wherein the first network of each block includes multiple outlets distributed across the bearing surface.

4. An improved saw guide system as in claim 2, wherein the second network block includes multiple outlets distributed across the bearing surface.

5. An improved saw guide system as in claim 2, wherein the outlets in the bearing surface include replaceable orifice nozzles.

6. A saw guide system for supporting thin blade circular saws in a multiple saw assembly, said system comprising:
a guide rack mounted on the saw assembly;
guide blocks mounted on the guide rack in a pattern to interdigitate with the saw blades and to provide support to saw blades located between adjacent guide blocks;
means integral to the guide rack and the guide blocks for distributing a fluid to both surfaces of each saw blade;
means external to the guide rack and the guide blocks for delivering lubricating oil to the fluid distribution means, including an air induction venturi for forming an oil spray;
means external to the guide rack and the guide blocks for delivering cooling water to the fluid distribution means, said cooling water delivering means being isolated from said lubricating oil delivery means; and
means connected to both the oil delivering means and the water delivering means for selectively directing either oil or water to the means integral to the guide rack and guide blocks for distributing a fluid.

7. A saw guide system as in claim 6, wherein the fluid distribution means includes a first network of fluid passages through the guide rack and guide blocks for distributing oil and a second network of fluid passages through the guide rack and guide blocks for distributing water, said first and second networks being isolated from each other.

8. A saw guide system as in claim 6, wherein the fluid distribution means includes a single network of fluid passages through the guide rack and guide blocks for distributing both oil and water.

9. A saw guide system as in claim 6, wherein the lubricating oil delivering means includes separate high volume and low volume pumps.

* * * * *